United States Patent
Suzuki et al.

(10) Patent No.: US 6,963,429 B2
(45) Date of Patent: Nov. 8, 2005

(54) IMAGE SENSING APPARATUS AND CONTROL METHOD THEREFOR

(75) Inventors: Nobukazu Suzuki, Kanagawa (JP); Noriko Suwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 09/862,623

(22) Filed: May 22, 2001

(65) Prior Publication Data

US 2001/0043372 A1   Nov. 22, 2001

(30) Foreign Application Priority Data

May 22, 2000  (JP) .............................. 2000-150472
Aug. 1, 2000  (JP) .............................. 2000-233659
May 8, 2001  (JP) .............................. 2001-137800

(51) Int. Cl.[7] ............................................. H04N 1/04
(52) U.S. Cl. .................... 358/474; 358/1.15; 358/505; 358/448; 358/468; 358/482
(58) Field of Search ................................ 358/474, 505, 358/448, 468, 482, 483, 486, 497, 413, 422, 358/1.15, 437

(56) References Cited

U.S. PATENT DOCUMENTS 5,239,393 A * 8/1993 Takeuchi ...................... 358/474
5,532,844 A * 7/1996 Kagami et al. ............. 358/468
6,459,506 B1 * 10/2002 Hu et al. ...................... 358/473
6,493,743 B2 * 12/2002 Suzuki ........................ 709/203

* cited by examiner

Primary Examiner—Kimberly Williams
Assistant Examiner—Negussie Worku
(74) Attorney, Agent, or Firm—Morgan & Finnegan, LLP

(57) ABSTRACT

In an image sensing apparatus which can be connected to a host computer, receives power from the host computer, and has an image sensing element for converting an optical image of an object into an electrical image signal, the host computer having a suspend/resume function of storing, for a program under processing, a state necessary for execution of the processing in memory and re-executing the interrupted processing of the program on the basis of stored contents, when the host computer is set in a suspend state during image sensing, operation of at least a part of the image sensing apparatus is stopped, and when the host computer is resumed, a predetermined portion of the image sensing apparatus is reset to a predetermined initial state.

21 Claims, 8 Drawing Sheets

IMAGE SENSING APPARATUS AND CONTROL METHOD THEREFOR

FIELD OF THE INVENTION

The present invention relates to an image sensing apparatus which can read the image of an object such as an original by an image sensor for converting the read image into an electrical image signal and transfer a digital image signal obtained through an A/D converter to an external device having a suspend/resume function.

BACKGROUND OF THE INVENTION

Many recent external devices to which an image sensing apparatus such as a video camera, camcorder, and scanner transfers an image signal have a suspend/resume function of saving, in a storage device, pieces of information necessary for execution of an OS and application that run on the external device when power-OFF is requested, and restoring these pieces of information when the apparatus is powered on again, thereby instantaneously reproducing the state immediately before the power-OFF request. This is mainly because power consumption of the external device can be suppressed.

When an external device having the suspend/resume function is set in a suspend state, an image sensing apparatus connected to the external device stops reading an image. When the external device is resumed, image reading is enabled again.

In the above arrangement, however, when the external device is set in the suspend state, pieces of information necessary for execution of the OS and application which are running in that state are saved in a storage device and then powered off, thus the external device interrupts the read application and also stops communication. Hence, when the image sensing apparatus is performing image read operation, the image sensing apparatus cannot transfer the image to the external device, so the image read operation is wasted. When the external device is resumed, image reading is enabled again. In this case, the positional relationship between an optical unit before the external device is set in the suspend state and that after the resume is indefinite, so image reading after the resume fails.

SUMMARY OF THE INVENTION

The present invention has been made in consideration of the above situation, and has as its object to provide an inexpensive image sensing apparatus, such as a video camera, digital camera, camcorder, or scanner, which can immediately perform stable image reading after the resume even when an external device executes suspend/resume while the image sensing apparatus is reading an image.

According to the present invention, the foregoing object is attained by providing an image sensing apparatus which can be connected to an external device and receives power from the external device, the external device having a suspend/resume function of storing, for a program under processing, a state necessary for execution of the processing in memory and re-executing the interrupted processing of the program on the basis of stored contents, comprising:

image sensing means for converting an optical image of an object into an electrical image signal; and control means for, when the external device is set in a suspend state during image sensing, stopping operation of at least a part of said image sensing means and resetting a predetermined portion of said image sensing apparatus to a predetermined initial state in response to resumption of the external device.

According to the present invention, the foregoing object is also attained by providing a control method for an image sensing apparatus which can be connected to an external device, receives power from the external device, and has image sensing means for converting an optical image of an object into an electrical image signal, the external device having a suspend/resume function of storing, for a program under processing, a state necessary for execution of the processing in memory and re-executing the interrupted processing of the program on the basis of stored contents, comprising:

the stop step of, when the external device is set in a suspend state during image sensing, stopping operation of at least a part of the image sensing means; and the reset step of resetting a predetermined portion of the image sensing apparatus to a predetermined initial state in response to resumption of the external device.

Further, the foregoing object is also attained by providing an image sensing apparatus connected to an external device having a suspend/resume function and driven upon receiving power from the external device, comprising:

image sensing means for converting an optical image of an object into an electrical image signal;

control means for controlling to perform predetermined operation upon detecting that the external device is set in a suspend state; and a backup battery for, when the external device is set in the suspend state, storing power necessary to perform the predetermined operation by said control means before the image sensing apparatus is set in the suspend state.

Furthermore, the foregoing object is also attained by providing an image sensing apparatus connectable to an external device having a suspend/resume function, comprising:

operation means; and control means for resuming the external device in accordance with predetermined operation by said operation means.

Further, the foregoing object is also attained by providing an image sensing apparatus connectable to an external device having a suspend/resume function, comprising:

state detection means; and control means for resuming the external device in accordance with detection of a predetermined state by said state detection means.

Further, the foregoing object is also attained by providing an image sensing apparatus connected to an external device having a suspend/resume function and driven upon receiving power from the external device, comprising control means for, when the external device is set in a suspend state, stopping said image sensing apparatus, and when the external device is resumed, controlling to perform predetermined operation upon receiving power from the external device.

Further, the foregoing object is also attained by providing a control method for an image sensing apparatus connected to an external device having a suspend/resume function, driven upon receiving power from the external device, and having image sensing means for converting an optical image of an object into an electrical image signal, comprising the steps of:

controlling to perform predetermined operation upon detecting that the external device is set in a suspend state; and storing, when the external device is set in the suspend state, power necessary to perform the predetermined operation in the control step before the image sensing apparatus is set in the suspend state.

Further, the foregoing object is also attained by providing a control method an image sensing apparatus which can be connected to an external device having a suspend/resume function and has operation means, comprising the step of resuming the external device in accordance with predetermined operation by the operation means.

Further, the foregoing object is also attained by providing a control method for an image sensing apparatus which can be connected to an external device having a suspend/resume function and has state detection means, comprising the step of resuming the external device in accordance with detection of a predetermined state by the state detection means.

Further, the foregoing object is also attained by providing a control method for an image sensing apparatus connected to an external device having a suspend/resume function and driven upon receiving power from the external device, comprising the steps of:

stopping the image sensing apparatus when the external device is set in a suspend state; and performing predetermined operation upon receiving power from the external device in response to resumption of the external device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
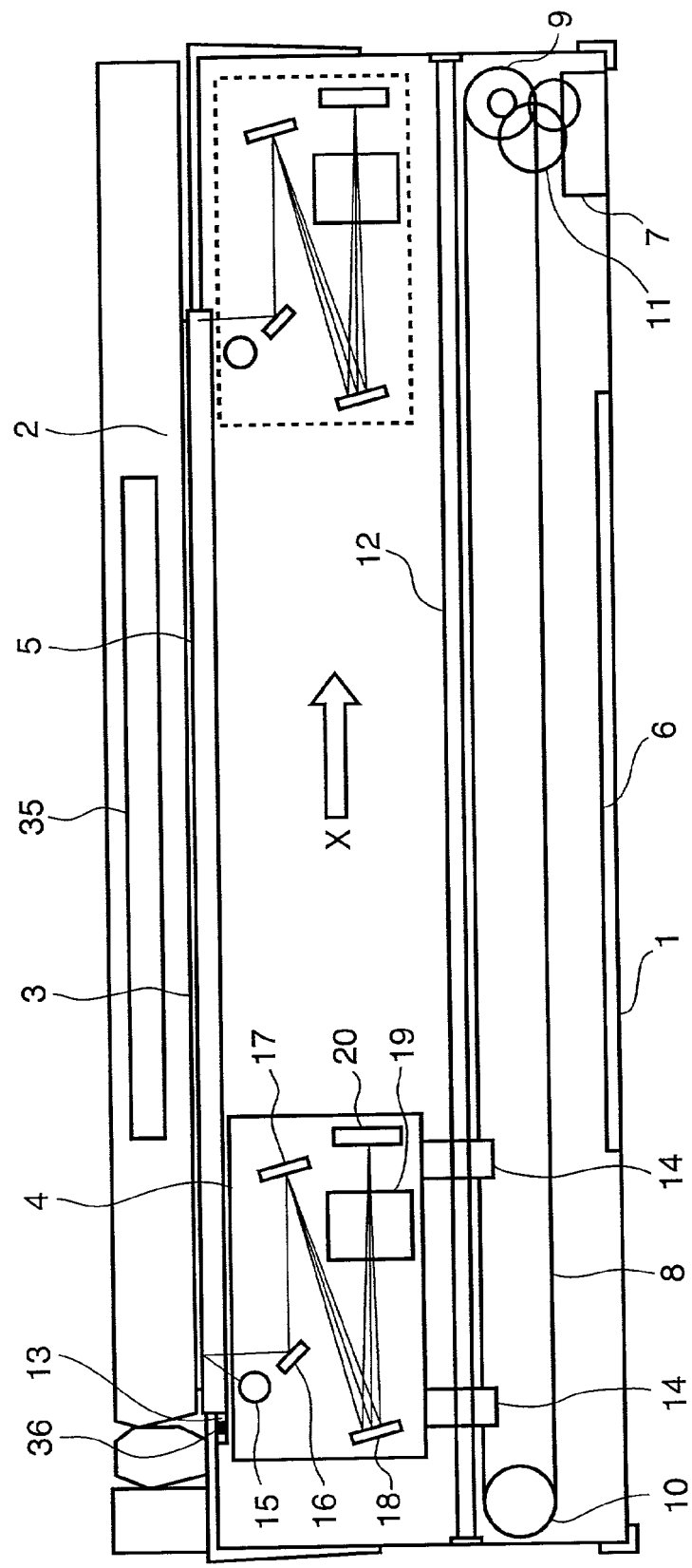
FIG. 1 is a sectional view showing the arrangement of an image sensing apparatus according to the first embodiment of the present invention.

In the first embodiment of the present invention, a scanner will be described as an example of an image sensing apparatus used in an image sensing system of the present invention. FIG. 1 is a sectional view of the scanner.

Referring to FIG. 1, reference numeral 1 denotes a scanner main body; 2, a transparent original unit; and 3, an original to be read.

The scanner 1 is connected to a host computer (to be referred to as a "host" hereinafter) by an interface cable (not shown). The host has a suspend/resume function in which all the information necessary for executing a program under processing is saved and maintained in memory when it is set in a suspend state and, when the host is resumed, the sequel processing of the program is executed on the basis of saved and maintained storage contents.

The scanner 1 has a movable optical unit 4, a platen glass 5, an electric board 6, a pulse motor 7, an endless belt 8, pulleys 9 and 10, a gear array 11, a guide rail 12, and a white reference board 13. A black mark 36 is formed on the white reference board 13. The scanner determines an area to be read (image read area) with reference to the black mark 36 and reads an image. The optical unit 4 and pulse motor 7 are electrically connected by a cable (not shown). The optical unit 4 is slidably mounted on the guide rail 12 by carrying unit 14. The carrying unit 14 are fixed to the endless belt 8.

The movable optical unit 4 comprises a light source 15 used for reading a reflective type original, a plurality of mirrors 16, 17, and 18, an imaging lens 19, and a line sensor 20 serving as an image sensing means.

The image read operation of the scanner 1 for reading a reflective type original will be briefly described. The image read operation by the scanner 1 is initiated in response to a read command from the host. The scanner 1 turns on the light source 15 of the optical unit 4, causes the plurality of mirrors 16, 17, and 18 to reflect the light reflected by the original, and forms the image of the light on the line sensor 20 through the imaging lens 19, thereby reading the image of one line in the main scanning direction. In addition, power from the pulse motor 7 is transmitted through the gear array 11 to rotate the pulley 9, thereby driving the endless belt 8. The optical unit 4 fixed to the endless belt 8 by the carrying unit 14 moves on the guide rail 12 in the sub-scanning direction indicated by an arrow X. The scanner 1 repeats the above-described image reading by line in the main scanning direction while moving the optical unit 4 in the sub-scanning direction. The scanner 1 can scan the entire surface of the platen glass 5 by moving the optical unit 4 to the position indicated by a dotted line while performing the read operation. The scanner 1 can also partially read the original image on the platen glass 5 in accordance with the contents of the read command from the host. This operation can be implemented by defining, by a control unit (to be described later) on the electric board, the pixel range to be employed from the sensor output in the main scanning direction and the moving range of the optical unit in the sub-scanning direction based on an image range to be read designated by the host.

The image read operation of the scanner 1 for reading a transparent original will be briefly described next.

The scanner 1 turns off the light source 15 of the optical unit 4, turns on a light source 35 for a transparent original, moves the optical unit 4 to the transparent original read position, causes the plurality of mirrors 16, 17, and 18 to reflect the transmitted light from the transparent original light source 35 through the transparent original, and forms the image of the light on the line sensor 20 through the imaging lens 19, thereby reading the image of one line in the main scanning direction. In addition, power from the pulse motor 7 is transmitted through the gear array 11 to rotate the pulley 9, thereby driving the endless belt 8. The optical unit 4 fixed to the endless belt 8 by the carrying unit 14 moves on the guide rail 12 in the sub-scanning direction indicated by the arrow X. The scanner 1 repeats the above-described image reading by line in the main scanning direction while moving the optical unit 4 in the sub-scanning direction. The scanner 1 can scan the transparent original by moving the optical unit 4 to the position indicated by the dotted line while performing the read operation. The scanner 1 can also partially read the original image on the platen glass 5 in accordance with the contents of the read command from the host. This operation can be implemented by defining, by the control unit on the electric board, the pixel range to be employed from the sensor output in the main scanning direction and the moving range of the optical unit in the sub-scanning direction based on an image range to be read designated by the host. Upon moving the optical unit in the sub-scanning direction, a system controller 26 selects an appropriate speed out of predetermined several speeds in accordance with the image read setting designated by the host, and image reading is performed using the selected speed.

Figure 2:
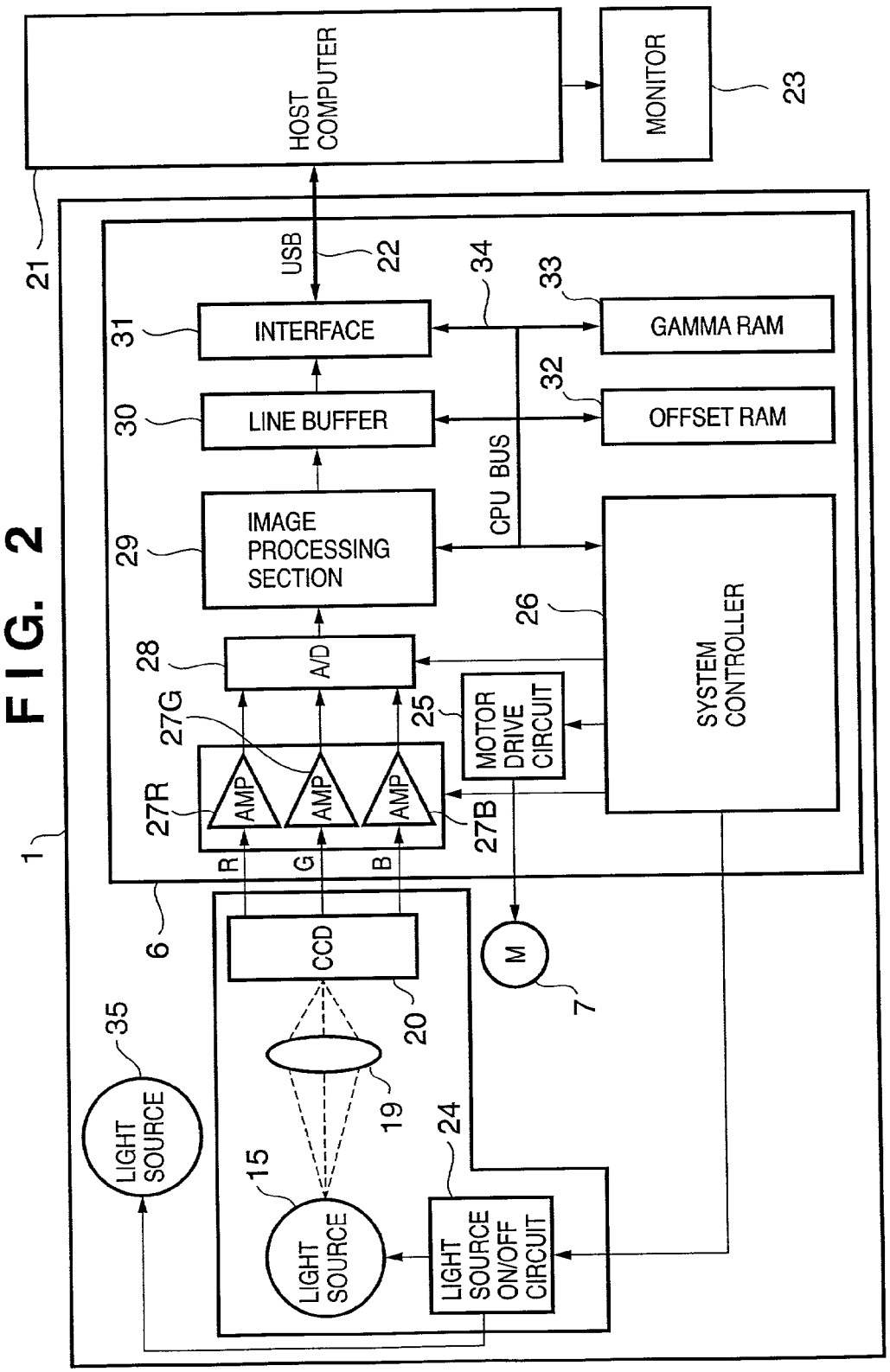
FIG. 2 is a block diagram showing the arrangement of the image sensing apparatus according to the first embodiment of the present invention.

The respective functions will be described next with reference to FIG. 2. FIG. 2 is a block diagram showing the functional arrangement of the scanner 1 and host 21.

In the optical unit 4, reference 24 denotes a light source ON/OFF circuit for turning on the light source 15 for a reflective original and light source 35 for a transparent original, which includes a detection unit for detecting the light amount of the light source. When the light source 15 and light source 35 use cold cathode tubes, the light source ON/OFF circuit 24 functions as a so-called inverter circuit. In the electric board 6, a motor drive circuit 25 for the pulse motor 7 outputs an exciting switching signal for the pulse motor 7 in accordance with a signal from the system controller 26 serving as a system control unit for the scanner 1. Analog gain adjusting devices 27R, 27G, and 27B are designed to be capable of variably amplifying analog image signals output from the line sensor 20. An A/D converter 28 converts the analog image signals output from the variable analog gain adjusting devices 27 into digital image signals. An image processing section 29 executes image processing such as offset correction, shading correction, digital gain adjustment, color balance adjustment, masking, resolution conversion in the main scanning/sub-scanning directions, and image compression.

A line buffer 30 for temporarily storing image data is implemented by a general-purpose random access memory. An interface section 31 is used for communication with the host 21. The interface section 31 here is implemented by a USB interface. However, another interface such as IEEE 1394 may be employed. An offset RAM 32 is used as a working area for image processing. Since the line sensor 20 is formed by parallelly arranging R, G, and B line sensors with a predetermined offset, the offset RAM 32 is used to correct the offset between the R, G, and B lines. The offset RAM also temporarily stores various data for shading correction and the like. The offset RAM is implemented by a general-purpose random access memory.

A gamma RAM 33 stores a gamma curve for gamma correction. The system controller 26 stores the sequence of the entire scanner and performs various control operations in accordance with commands from the host 21. A system bus 34 connects the system controller 26, image processing section 29, line buffer 30, interface section 31, offset RAM 32, and gamma RAM 33 and comprises an address bus and data bus. In the first embodiment, power is supplied from the host computer through a USB or the like. Hence, when the host is set in the suspend state, the scanner is powered off.

Figure 3:
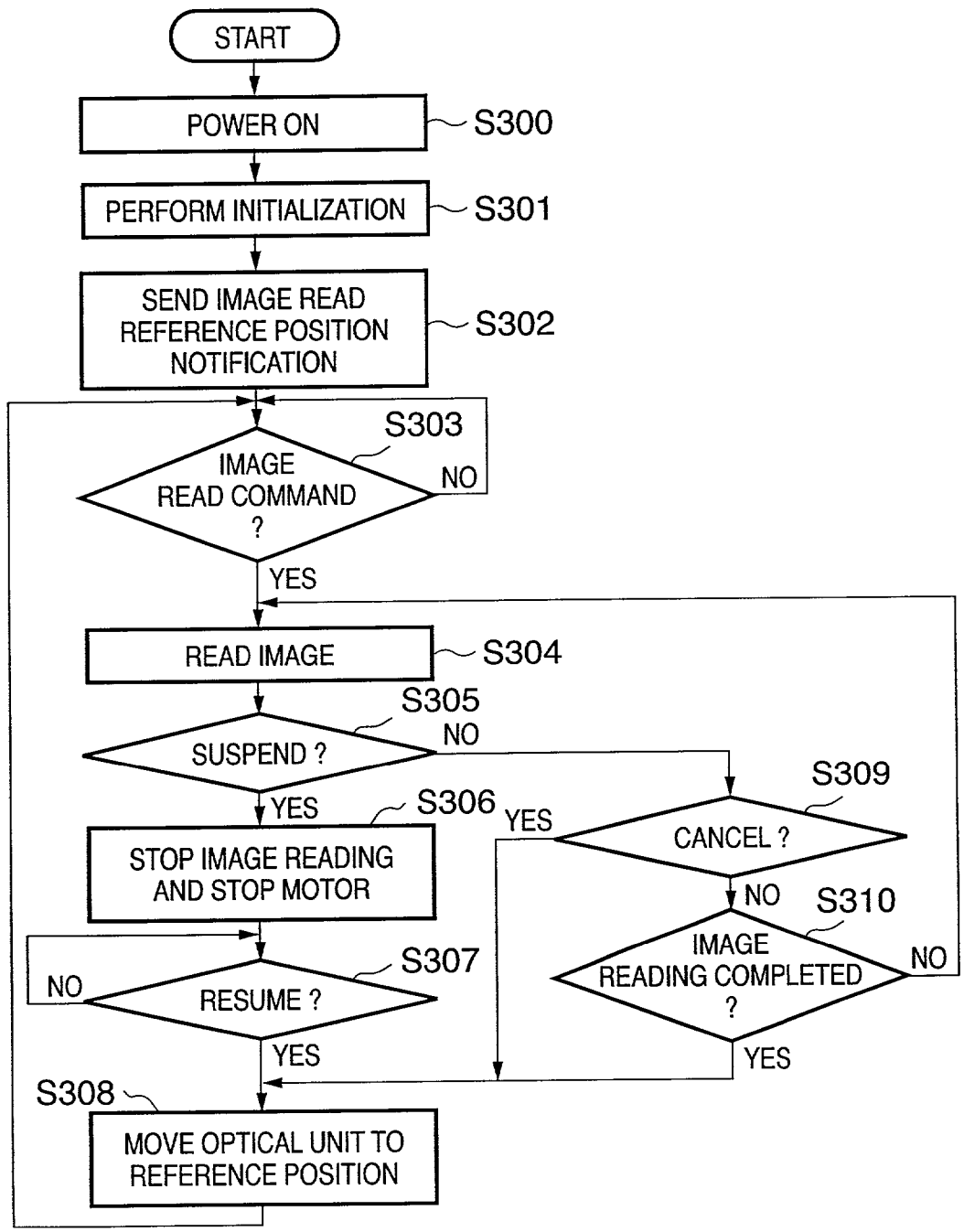
FIG. 3 is a flow chart showing the operation of the image sensing apparatus according to the first embodiment of the present invention.

A control method for the image read operation of the scanner 1 according to the first embodiment of the present invention will be described next with reference to FIG. 3. In the first embodiment, the system controller 26 sends a control signal for the pulse motor 7 to the motor drive circuit 25, thereby changing the position of the movable optical unit 4.

When the scanner 1 is powered on (step S300), initialization is performed to, e.g., determine the image read reference position of the scanner 1 (step S301), so the image read enable state is set. A notification of the image read reference position determined in step S301 is sent to the host 21 (step S302).

When the host 21 issues a command for instructing the scanner to read a reflective original or transparent original (YES in step S303), the scanner 1 repeats the above-described line image reading in the main scanning direction while moving the optical unit 4 in the sub-scanning direction (step S304). If the host 21 is not set in the suspend state (NO in step S305), and the image reading is not canceled (NO in step S309), the scanner 1 moves the optical unit 4 to the read end position indicated by the dotted line in FIG. 1 (i.e., until YES in step S310) while performing the read operation, thereby reading the image read area designated by the host 21 and transferring the read image to the host 21. When the image reading is ended (YES in step S310), the optical unit 4 is returned to the image read reference position (step S308).

When the host 21 is set in the suspend state during image reading (YES in step S305), the host 21 saves, in the storage device, pieces of information necessary for execution of the OS which is running in that state and an application, including the read reference position sent from the scanner 1 in step S302, and is powered off. Hence, the host 21 interrupts the read application and also stops communication. Under this situation, if the scanner 1 is performing the image read operation, the scanner 1 cannot transfer the image to the host 21. For this reason, the scanner 1 stops moving the optical unit 4 and stops the image read operation (step S306). The scanner 1 holds this state until the host 21 is resumed (step S307). When the host is resumed (YES in step S307), the optical unit 4 is returned to the image read reference position (step S308). Since the optical unit 4 is returned to the image read reference position, when an image read command is sent from the host 21 again after the resume, the scanner 1 can send the read image to the host 21 without any positional shift between the optical unit before suspend and that after the resume.

Further, the host 21 can know that the image transmitted after the resume is an image read from the image read reference position received in step S302. Hence, any positional shift between the images before suspend and after the resume, which is caused by mismatching between the positions of the optical unit in the image sensing apparatus, can be prevented, unlike the prior art.

<Second Embodiment>

The second embodiment will be described next.

Figure 4:
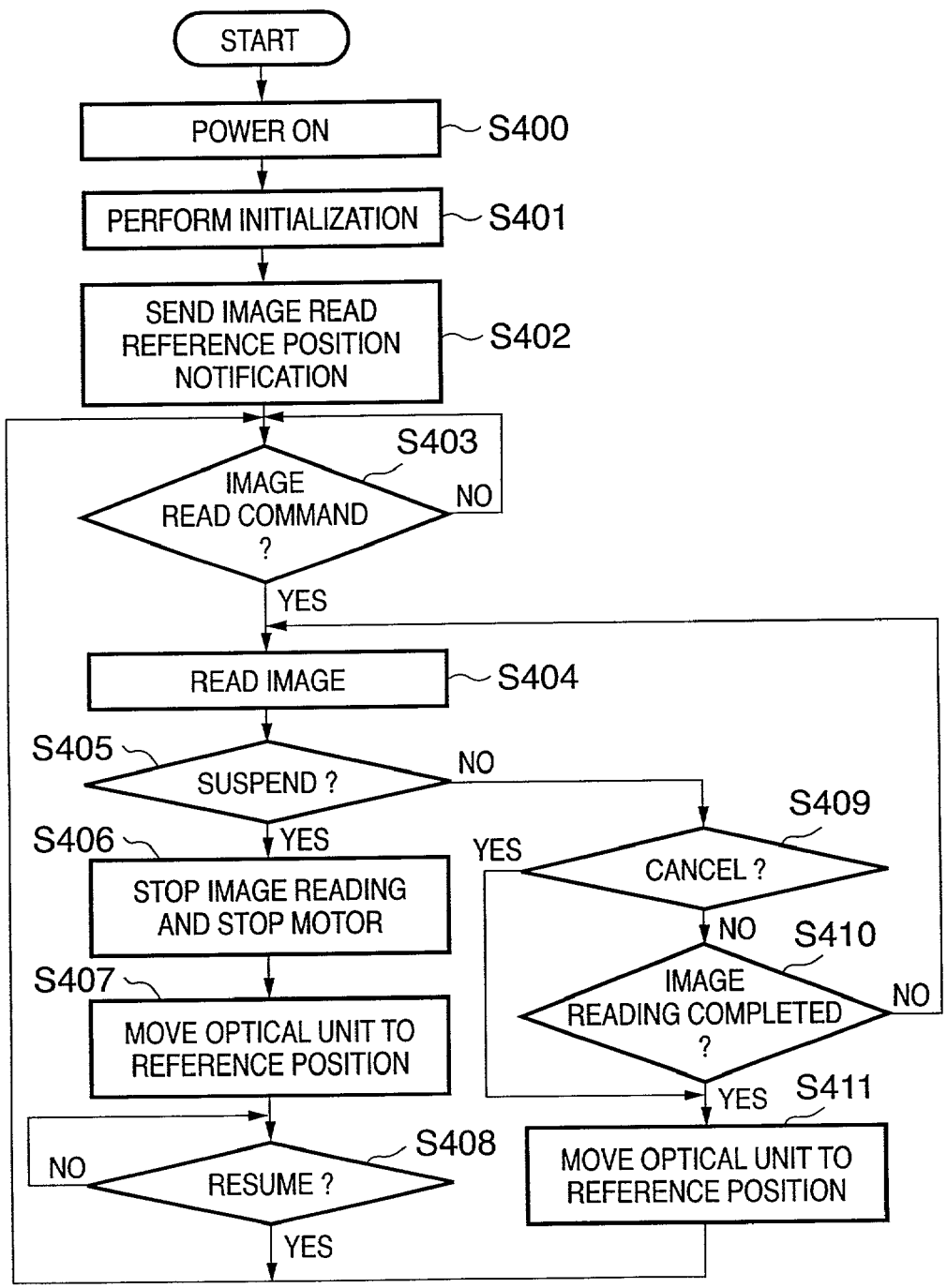
FIG. 4 is a flow chart showing the operation of an image sensing apparatus according to the second embodiment of the present invention.

An image sensing apparatus according to the second embodiment has the same system configuration as that described in the first embodiment with reference to FIGS. 1 and 2. In the second embodiment, however, the image sensing apparatus has a capacitor for storing power to be supplied to the scanner through a bus such as a USB and a backup battery (not shown) such as a secondary battery. An image read operation by a scanner 1 according to the second embodiment will be described below with reference to FIG. 4.

When the scanner 1 is powered on (step S400), various initialization is performed to, e.g., determine the image read reference position of the scanner 1 (step S401), so the image read enable state is set. A notification of the image read reference position determined in step S401 is sent to the host 21 (step S402).

When the host 21 issues a command for instructing the scanner to read a reflective original or transparent original (YES in step S403), the scanner 1 repeats the above-described line image reading in the main scanning direction while moving an optical unit 4 in the sub-scanning direction (step S404). If the host 21 is not set in the suspend state (NO in step S405), and the image reading is not canceled (NO in step S409), the scanner 1 moves the optical unit 4 to the read end position indicated by the dotted line in FIG. 1 (i.e., until YES in step S410) while performing the read operation, thereby reading the image read area designated by the host 21 and transferring the read image to the host 21. When the image reading is ended (YES in step S410), the optical unit 4 is returned to the image read reference position (step S411).

When the host 21 is set in the suspend state during image reading (YES in step S405), the host 21 saves, in the storage device, pieces of information necessary for execution of the OS which is running in that state and an application, including the read reference position sent from the scanner 1 in step S302, and is powered off. Hence, the host 21 interrupts the read application and also stops communication. Under this situation, if the scanner 1 is performing the image read operation, the scanner 1 cannot transfer the image to the host 21. For this reason, the scanner 1 stops moving the optical unit 4, stops the image read operation (step S406), and returns the optical unit 4 to the image read reference position using a backup battery (not shown) (step S407). When the host is resumed (step S408), and an image read command is issued again (step S403), the image reading is resumed from the reference position. Since the optical unit 4 is returned to the image read reference position in response to the suspend state, when an image read command is sent from the host 21 again after the resume, the scanner 1 can send the read image to the host 21 without any positional shift between the optical unit before suspend and that after the resume.

Further, the host 21 can know that the image transmitted after the resume is an image read from the image read reference position received in step S402. Hence, any positional shift between the images before suspend and after the resume, which is caused by mismatching between the positions of the optical unit in the image sensing apparatus, can be prevented, unlike the prior art.

<Third Embodiment>

The third embodiment will be described below.

Figure 5:
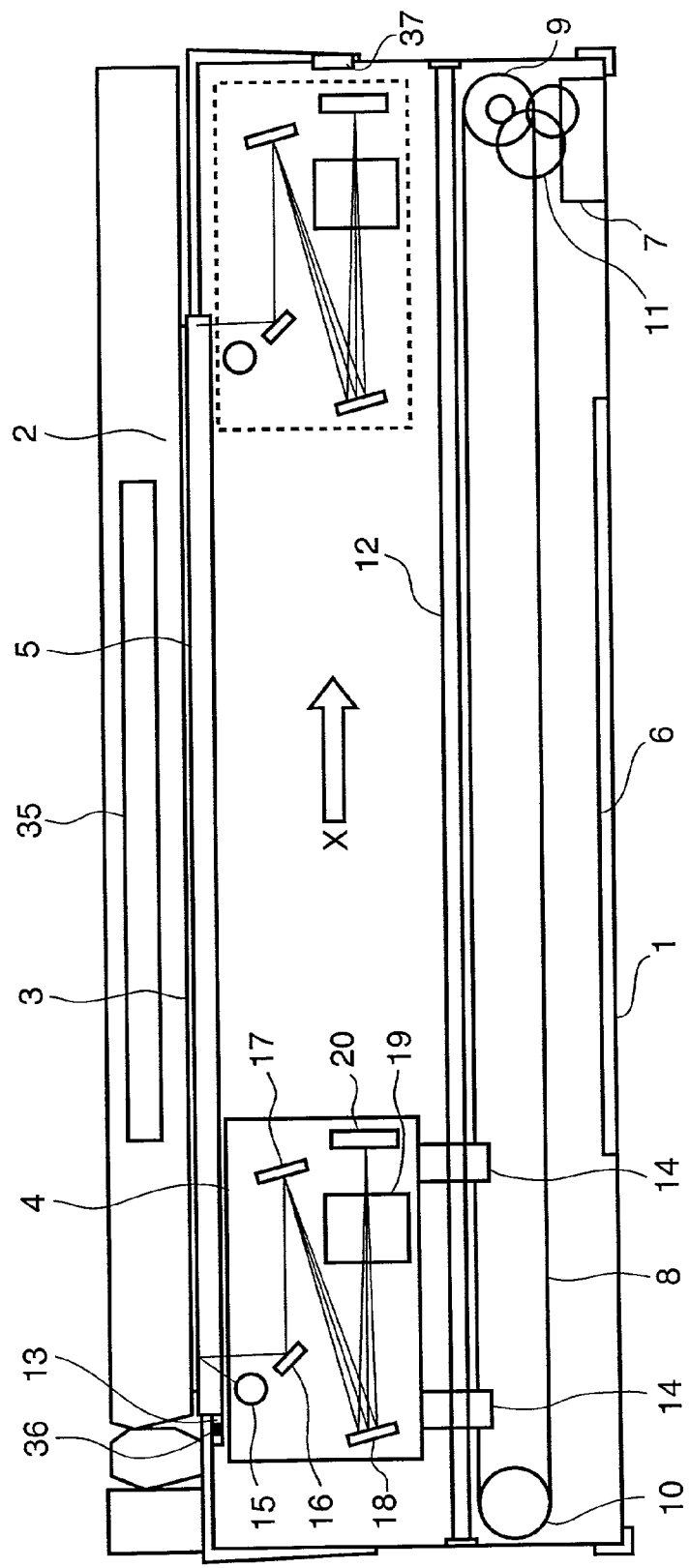
FIG. 5 is a sectional view showing the arrangement of an image sensing apparatus according to the third embodiment of the present invention.

In the third embodiment of the present invention as well, a scanner will be described as an example of an image sensing apparatus used in an image sensing system. FIG. 5 is a sectional of the scanner. The same reference numerals as in FIG. 1 denote the same elements in FIG. 5, and a detailed description thereof will be omitted. A scanner 1 shown in FIG. 5 further comprises a scan switch 37 in addition to the components shown in FIG. 1. When the scan switch 37 is pressed, the scanner 1 starts reading an image. When the host 21 is in the suspend state, the host 21 can be resumed by pressing the scan switch 37.

Figure 6:
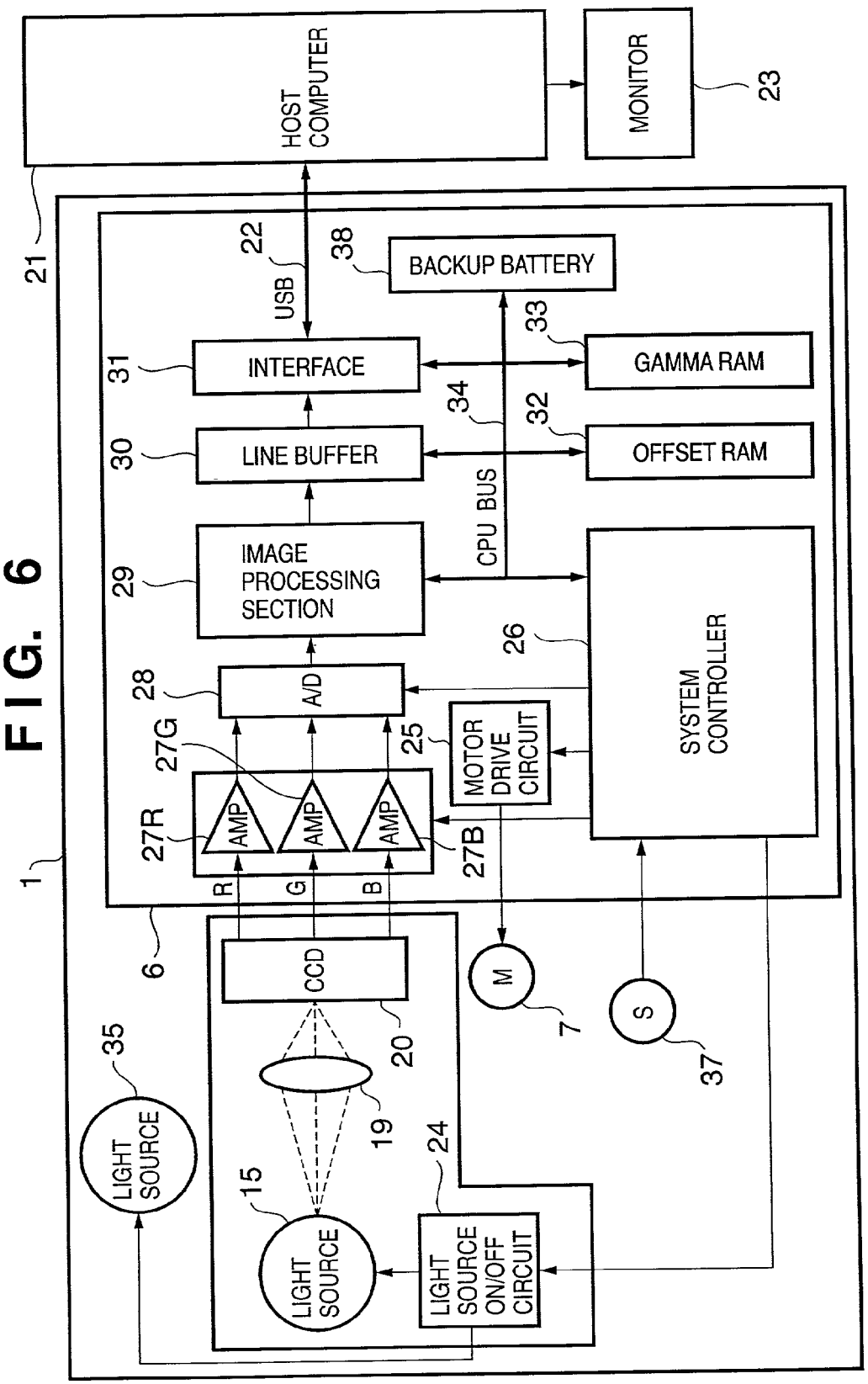
FIG. 6 is a block diagram showing the arrangement of the image sensing apparatus according to the third embodiment of the present invention.

FIG. 6 is a block diagram showing the function of the scanner 1, which is different from FIG. 2 in that the scan switch 37 is added. The input signal from the scan switch 37 is sent to a system controller 26. A backup battery 38 can be charged through the USB before suspend to allow the minimum operation of the scanner 1 during suspend.

Figure 7:
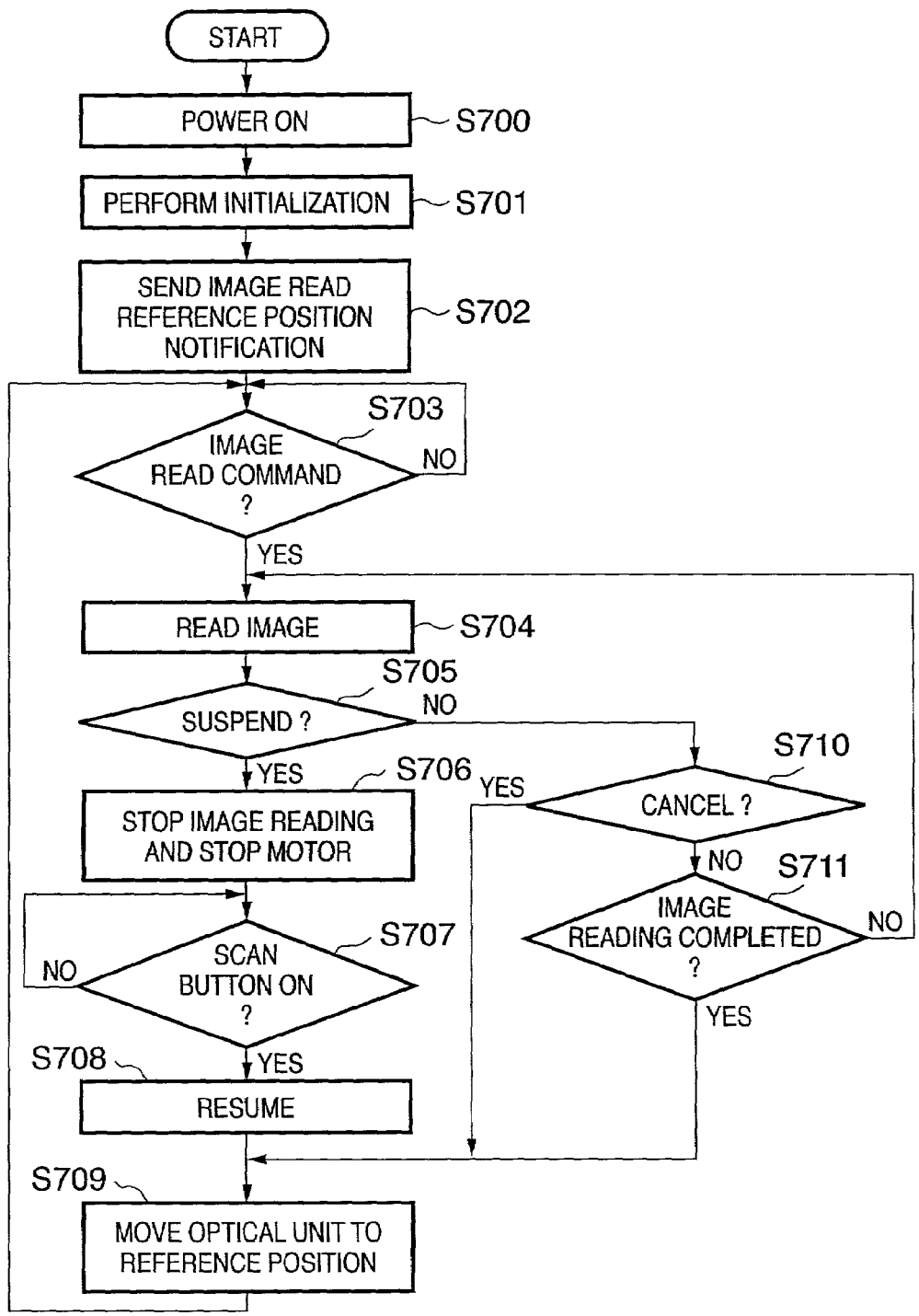
FIG. 7 is a flow chart showing the operation of the image sensing apparatus according to the third embodiment of the present invention.

A control method for an image read operation of the scanner 1 according to the third embodiment will be described next with reference to FIG. 7. In the third embodiment, the system controller 26 sends a control signal for the motor 7 to the motor drive circuit 25 in accordance with the input signal from the scan switch 37, thereby moving a movable optical unit 4.

When the scanner 1 is powered on (step S700), initialization is performed to, e.g., determine the image read reference position of the scanner 1 (step S701), so the image read enable state is set. A notification of the image read reference position determined in step S701 is sent to the host 21 (step S702).

When the host 21 issues a command for instructing the scanner to read a reflective original or transparent original, or the scan switch 37 is pressed (YES in step S703), the scanner 1 repeats the above-described line image reading in the main scanning direction while moving the optical unit 4 in the sub-scanning direction (step S704). If the host 21 is not set in the suspend state (NO in step S705), and the image reading is not canceled (NO in step S710), the scanner 1 moves the optical unit 4 to the read end position indicated by the dotted line in FIG. 5 (i.e., until YES in step S711) while performing the read operation, thereby reading the image read area designated by the host 21 and transferring the read image to the host 21. When the image reading is ended (YES in step S711), the optical unit 4 is returned to the image read reference position (step S709).

When the host 21 is set in the suspend state during image reading (YES in step S705), the host 21 saves, in the storage device, pieces of information necessary for execution of the OS which is running in that state and an application, including the read reference position sent from the scanner 1 in step S702, and is powered off. Hence, the host 21 interrupts the read application and also stops communication. Under this situation, if the scanner 1 is performing the image read operation, the scanner 1 cannot transfer the image to the host 21. For this reason, the scanner 1 stops moving the optical unit 4 and stops the image read operation (step S706).

If the user wants image reading, he/she presses the scan switch 37 of the scanner 1 (YES in step S707) to resume the host 21 (step S708) and the optical unit 4 is returned to the image read reference position (step S709). The scanner 1 starts reading the image again. As described above, by pressing the scan switch 37 of the scanner 1, the host 21 is resumed, and the optical unit 4 is returned to the image read reference position, and then, the scanner 1 restarts reading the image. Thereby the image reading can be executed regardless of the state of the host 21 when the user wants to make the scanner 1 read the image.

Further, the host 21 can know that the image transmitted after the resume is an image read from the image read reference position received in step S702. Hence, any positional shift between the images before suspend and after the resume, which is caused by mismatching between the positions of the optical unit in the image sensing apparatus, can be prevented, unlike the prior art.

In the third embodiment as well, it is possible to control the optical unit 4 so as to return to the image read reference position immediately after the image reading is stopped in step S706, as in the second embodiment.

<Fourth Embodiment>

The fourth embodiment will be described next.

In the fourth embodiment as well, a scanner will be described as an example of an image sensing apparatus used in an image sensing system. The image sensing system has the same configuration as that described in the first embodiment with reference to FIGS. 1 and 2, and a description thereof will be omitted.

A control method for an image read operation according to the fourth embodiment of the present invention will be described next with reference to the flow chart shown in FIG. 8.

When a scanner 1 is powered on (step S801), initialization for control of the pulse motor 7, offset RAM 32, gamma RAM 33, and the like of the scanner 1 is performed (step S802). Next, initialization for image reading is performed (step S803). Initialization for image reading includes home position detection, lamp adjustment, and shading data acquisition. Which processing is to be performed varies depending on the apparatus. When initialization is ended, the scanner 1 is set in the standby state in which an image can be read (step S804).

It is determined in step S805 whether scan start operation is performed, and processing waits until the scan start operation is performed. The scan start operation is operation that the host 21 issues a command for reading a reflective original. In accordance with this operation, scanning starts (step S806). The scanner 1 repeats the above-described line image reading in the main scanning direction while moving an optical unit 4 in the sub-scanning direction (step S807). The scanner 1 moves the optical unit 4 to the read end position indicated by the dotted line in FIG. 1 while performing the read operation, thereby reading the image read area designated by the host 21 and transferring the read image to the host 21.

During image reading, it is determined whether the host 21 is in the suspend state (step S808). If the host is not in the suspend state (NO in step S808), it is determined in step S809 whether reading of the scan range is ended (step S809). If the reading is not ended (NO in step S809), the flow returns to step S807 to continuously read the image. When the reading of the scan range is ended (YES in step S809), the scanner 1 returns to the standby state in step S804.

When the host 21 is set in the suspend state (YES in step S808), the host 21 saves, in the storage device, pieces of information necessary for execution of the OS which is running in that state and an application and is powered off. Hence, the host 21 interrupts the read application and also stops communication. Under this situation, if the scanner 1 is performing the image read operation, the scanner 1 cannot transfer the image to the host 21. For this reason, when it is detected that the host 21 is in the suspend state, and more specifically, when the suspend state is detected in accordance with the state of the USB signal, the optical unit 4 is stopped and image read operation is suspended (step S810). The scanner 1 holds that state until the host 21 is resumed.

It is determined in step S811 whether the host 21 is in the resume state. If the host 21 is not in the resume state, the image reading is kept stopped. When the host 21 is resumed (YES in step S811), i.e., when it is detected that the state of the USB signal represents the resume state, as in detecting the suspend state, the scanner 1 performs initialization in step S812 because the reading has been interrupted, and moves the optical unit 4 to the image read reference position in step S813. More specifically, after the interruption of reading, initialization for control of the pulse motor 7, offset RAM 32, gamma RAM 33, and the like is performed. Initialization for image reading is preformed in step S814. More specifically, initialization for image reading includes home position detection, lamp adjustment, and shading data acquisition. Which processing is to be performed varies depending on the apparatus. When initialization is ended, the scanner 1 returns to the standby state in step S804. When the scanner 1 receives an image read command from the host 21 again, the image reading can be immediately started.

As described above, according to the fourth embodiment, even when the host is set in the suspend state during image reading, the scanner is initialized when the host is set in the resume state whereby image reading can be immediately executed when the image reading is instructed again.

Figure 8:
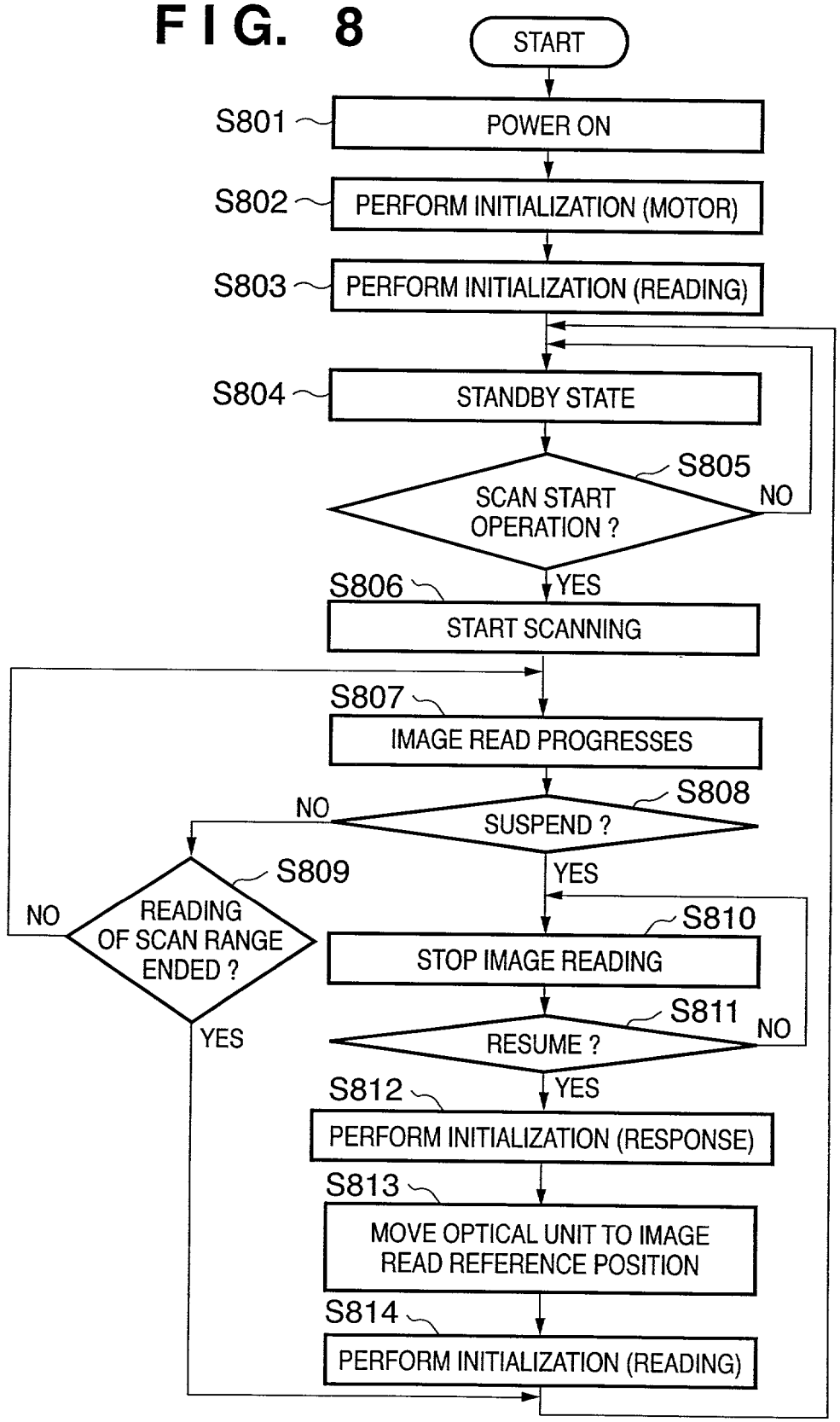
FIG. 8 is a flow chart showing the operation of an image sensing apparatus according to the fourth embodiment of the present invention.

Referring to FIG. 8, when the host 21 changes from the suspend state to the resume state in step S811, the flow may return to step S802 without executing steps S812 to 814 to perform initialization performed upon power-ON (steps S802 and S803). When the optical unit 4 is not at the read reference position immediately after the interruption of image reading, initialization for control of the pulse motor 7, offset RAM 32, gamma RAM 33, and the like is performed, and then, the optical unit 4 is returned to the read reference position.

In the fourth embodiment, the initialization operation is performed after the resume. However, as described in the second embodiment, the initialization operation may be performed after the suspend before the resume. Alternatively, as described in the third embodiment, a scan switch may be provided in the scanner 1, and the host 21 may be resumed in response to the pressing of the switch.

In the first to fourth embodiments, a scanner is used as an image sensing apparatus. However, the present invention is not limited to this and can be widely applied to an image sensing apparatus such as a video camera, camcorder, and digital still camera.

<Fifth Embodiment>

The fifth embodiment will be described next.

A system according to the fifth embodiment has an arrangement for executing a program for controlling the image sensing apparatus 1 on the host 21. In the first to fourth embodiments, control of the image sensing apparatus 1, which is represented by the flow charts of FIG. 3, 4, 7, or 8, is performed by a system controller 26 in the image sensing apparatus 1. In the fifth embodiment, however, the program for controlling the image sensing apparatus 1 is executed on the host computer 21. Using a signal generated by executing the program, a command for each operation is issued to the image sensing apparatus 1. In this case, the program for controlling the image sensing apparatus 1 is notified in advance of the shift of the host computer 21 to the suspend state by an OS which is running on the host 21.

The image sensing apparatus 1 is instructed to perform operation corresponding to the suspend in the program executed by the system controller 26 (step S306 corresponding to step S305, steps S406 and S407 corresponding to step S405, step S706 corresponding to step S705, and step S810 corresponding to step S808). After that, the host 21 shifts to the suspend state. For an image sensing apparatus driven by an external power supply or a battery, the host computer shifts to the suspend state and then ends corresponding operation and waits for the resume. When the host computer 21 is resumed, the host computer 21 executes the program for controlling the image sensing apparatus 1, thereby starting the operation from the resume step (steps S308, S403, S709, and S812).

[Other Embodiment]

The present invention can be applied to a system constituted by a plurality of devices or to an apparatus comprising a single device. In the third embodiment, an original switch which is turned on when an original is inserted or placed at a predetermined position may be provided, and the host computer may be resumed by detecting the original switch or scan switch 37.

In addition, any other operation can be performed to set the image sensing apparatus in a predetermined initial state as long as the position and setting of the movable member can be reset.

Furthermore, in returning the optical unit to a predetermined sub-scanning position, the position may be either a home position or another sub-scanning position other than the reference position.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIG. 3, 4, 7 or 8 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus which can be connected to an external device and receives power from the external device, the external device having a suspend/resume function of storing, for a program under processing, a state necessary for execution of the processing in memory then turning off the power in the suspend state and re-executing the interrupted processing of the program on the basis of stored contents in response to turning on of the power, comprising:

an image sensor adapted to convert an optical image of an object into an electrical image signal; and a controller adapted to, when the external device is set in a suspend state during image sensing, stop operation of at least a part of said image sensor and reset a predetermined portion of said image sensing apparatus to a predetermined initial state in response to resumption of the external device.

2. The apparatus according to claim 1, wherein said controller resets said image sensor to a predetermined initial state in response to resumption of the external device.

3. The apparatus according to claim 1 further comprising a setting until adapted to set a reference position where image reading by said image sensor is started in response to resumption of the external device, wherein said controller controls said image sensor to start image reading from the reference position in response to resumption of the external device.

4. The apparatus according to claim 1, wherein the predetermined initial state is a state wherein an optical unit in said image sensor is at a predetermined position.

5. The apparatus according to claim 4, further comprising a motor as a driver for moving the optical unit, wherein said controller resets said motor to an initial state in response to resumption of the external device.

6. The apparatus according to claim 1 further comprising memory, wherein said controller resets said memory to an initial state in response to resumption of the external device.

7. The apparatus according to claim 1, wherein said controller resets at least one of home position detection, lamp adjustment, and shading data acquisition to the predetermined initial state in response to resumption of the external device.

8. The apparatus according to claim 1 further comprising an operation unit, wherein when the external device is set in the suspend state, the external device is resumed in accordance with predetermined operation by said operation unit.

9. The apparatus according to claim 1 further comprising a state detection unit, wherein when the external device is set in the suspend state, the external device is resumed in accordance with detection of a predetermined state by said state detection unit.

10. The apparatus according to claim 1 further comprising a notification unit for notifying the external device of the predetermined initial state.

11. A control method for an image sensing apparatus which can be connected to an external device, receives power from the external device, and has an image sensor adapted to convert an optical image of an object into an electrical image signal, the external device having a suspend/resume function of storing, for a program under processing, a state necessary for execution of the processing in memory then turning off the power in the suspend state and re-executing the interrupted processing of the program on the basis of stored contents in response to turning on of the power, comprising:

the stop step of, when the external device is set in a suspend state during image sensing, stopping operation of at least a part of the image; and the reset step of resetting a predetermined portion of the image sensing apparatus to a predetermined initial state in response to resumption of the external device.

12. The method according to claim 11, wherein, in the reset step, image sensor is reset to a predetermined initial state in response to resumption of the external device.

13. The method according to claim 11, further comprising the setting step of setting a reference position where image reading by the image sensor is started in response to resumption of the external device, and the control step of controlling the image sensor to start image reading from the reference position in response to resumption of the external device.

14. The method according to claim 11, wherein the predetermined initial state is a state wherein an optical unit in the image sensor is at a predetermined position.

15. The method according to claim 14, wherein the image sensing apparatus further comprises a motor as a driver for moving the optical unit, and in the reset step, the motor is reset to an initial state in response to resumption of the external device.

16. The method according to claim 11, wherein the image sensing apparatus further comprises memory, and in the reset step, the memory is reset to an initial state in response to resumption of the external device.

17. The method according to claim 11, wherein, in the reset step, at least one of home position detection, lamp adjustment, and shading data acquisition is reset to the predetermined initial state in response to resumption of the external device.

18. The method according to claim 11, wherein the image sensing apparatus further comprises an operation unit, and the method further comprises the step of, when the external device is set in the suspend state, resuming the external device in accordance with predetermined operation by the operation unit.

19. The method according to claim 11, wherein the image sensing apparatus further comprises a state detection unit, and the method further comprises the step of, when the external device is set in the suspend state, resuming the external device in accordance with detection of a predetermined state by the state detection unit.

20. The method according to claim 11, further comprising the notification step of notifying the external device of the predetermined initial state.

21. A computer program product comprising a computer usable medium having computer readable program code means embodied in said medium for controlling an image sensing apparatus which can be connected to an external device, receives power from the external device, and has an image sensor adapted to convert an optical image of an object into an electrical image signal, the external device having a suspend/resume function of storing, for a program under processing, a state necessary for execution of the processing in memory then turning off the power in the suspend state and re-executing the interrupted processing of the program on the basis of stored contents in response to turning on of the power, said product including:

first computer readable program code means for, when the external device is set in a suspend state during image sensing, stopping operation of at least a part of the image sensor; and second computer readable program code means for resetting a predetermined portion of the image sensing apparatus to a predetermined initial state in response to resumption of the external device.

* * * * *